United States Patent
Alba Pinto et al.

(10) Patent No.: US 8,339,405 B2
(45) Date of Patent: Dec. 25, 2012

(54) PROGRAMMABLE DATA PROCESSING CIRCUIT

(75) Inventors: Carlos Antonio Alba Pinto, Eindhoven (NL); Ramanathan Sethuraman, Bangalore (IN)

(73) Assignees: Intel Corporation, Santa Clara, CA (US); Intel Benelux B.V., Eindhoven (NL)

( * ) Notice: Subject to any disclaimer, the term of this patent is extended or adjusted under 35 U.S.C. 154(b) by 749 days.

(21) Appl. No.: 12/299,671

(22) PCT Filed: May 7, 2007

(86) PCT No.: PCT/IB2007/051703
§ 371 (c)(1),
(2), (4) Date: Nov. 5, 2008

(87) PCT Pub. No.: WO2007/132399
PCT Pub. Date: Nov. 22, 2007

(65) Prior Publication Data
US 2009/0135192 A1    May 28, 2009

(30) Foreign Application Priority Data
May 9, 2006   (EP) .................................... 06113654

(51) Int. Cl.
*G09G 5/39*   (2006.01)
*G06F 13/18*  (2006.01)
*G06F 13/00*  (2006.01)

(52) U.S. Cl. ......... 345/531; 345/535; 345/536; 345/537

(58) Field of Classification Search .................. 345/530, 345/531, 535–537
See application file for complete search history.

(56) References Cited

U.S. PATENT DOCUMENTS

| | | | |
|---|---|---|---|
| 4,819,152 A * | 4/1989 | Deerfield et al. | 711/217 |
| 5,341,489 A | 8/1994 | Heiberger et al. | |
| 7,451,282 B2 * | 11/2008 | Meier et al. | 711/158 |
| 2002/0163512 A1 | 11/2002 | Staudacher | |
| 2005/0083337 A1 | 4/2005 | Jaspers | |

FOREIGN PATENT DOCUMENTS

| | | |
|---|---|---|
| EP | 0629952 A1 | 12/1994 |
| WO | 9004576 A2 | 5/1990 |
| WO | 2005104027 A2 | 11/2005 |

OTHER PUBLICATIONS

IBM Technical Disclosure Bulletin, "Selectable Memory Card Interleave Scheme" IBM Corp. New York, US, vol. 30, No. 11, Apr. 1, 1988, pp. 158-161, XP000023836.

* cited by examiner

*Primary Examiner* — Hau Nguyen
(74) *Attorney, Agent, or Firm* — Leydig, Voit & Mayer, Ltd.

(57) ABSTRACT

A programmable data processing circuit has a memory for storing pixel values, or more generally data values as a function of position in a signal. The programmable data processing circuit supports instructions that include an indication of a selected parameter value set that indicates how a plurality of data values must be arranged for parallel output from a memory. Instructions that indicate different parameter value sets can be executed intermixed with one another. The programmable data processing circuit responds to instructions of this type by retrieving the selected parameter value sets from a parameter storage circuit (246), and controlling a switching circuit (22) between a memory port (21) of a memory circuit (20) and a data port (26) at least partly dependent on the selected parameter value set.

25 Claims, 3 Drawing Sheets

PROGRAMMABLE DATA PROCESSING CIRCUIT

FIELD OF THE INVENTION

The invention relates to a programmable data processing circuit with a memory for storing location dependent data values, such as pixel values in a two-dimensional image that are a function of pixel location. The invention also relates to a method of processing location dependent data values and to a computer program product for processing location dependent data values.

BACKGROUND OF THE INVENTION

Image processing generally involves use of pixel values that are stored in a memory. Pixel values for different pixel locations are stored at different memory locations. Various mappings of pixel locations to memory locations can be used. Such mappings have a considerable effect on image processing. US 2005/0083337 describes how memory access speed can be improved by suitable mapping. WO 2005/104027 describes a memory access circuit that compensates for mapping when pixels values for a plurality of pixel locations are used in parallel as operands for image processing operations.

US 2005/0083337 describes an image processing system that provides for alternate ways of storing image data in a memory. Different image processing algorithms require access to pixel values according to different sequences of pixel locations. Thus for example display of an image requires reading on a line-by-line basis; image decompression typically requires block-based reading. A memory device is used that provides for faster access to pixel values that are stored consecutively than to pixel values that are stored distributed over different memory parts. As a result access for display purposes can be done most quickly if pixel values along an image line are stored consecutively, but block based access can be done most quickly if pixel values of along successive lines of a block are stored consecutively.

In many applications both display using line based access and decompression using block-based access will be used. US 2005/0083337 supports this by storing pixel values grouped in different ways so that optimal speed can be realized for different forms of access. The grouping depends on parameters such as block width and height, the probability distribution of addresses and on properties of the memory device, such as width of the memory bus and the number of memory banks. When pixel values are written, multiple copies of the pixel values are written, grouped in different ways, according to the way in which the pixel values will be read.

US 2005/0083337 provides for address mapping from logical addresses (e.g. pixel coordinates) to physical addresses in the memory where the data values will be written. Different address mappings are needed to store the pixel values in different groupings. A look-up table memory is provided to describe the mappings. An address generator uses the look up table to generate the physical addresses from the logical addresses. The address mapping is selected based on a determination of the mapping that will result in minimum cost (in terms of access speed) for a given program. US 2005/0083337 is not directed at parallel processing of a plurality of pixel values.

WO 2005/104027 describes an image processing circuit that provides parallel access to pixel values from a working memory. The working memory stores pixels values for a region of pixel locations. Typically the region is part of a larger image for which pixel values are stored in a main memory. In this case, the working memory acts as a cache that stores copies of part of the pixels values from the main memory.

The working memory comprises memory banks that are able to output pixel values in parallel. The parallel-output pixels are supplied to a parallel pixel processor (e.g. a SIMD (Single Instruction Multiple Data) circuit), optionally after intermediate parallel storage in a register of a register file. When the pixel values are supplied in parallel there must be a predetermined relation between positions of the pixel values in the parallel output and the relative positions of the corresponding pixel locations with respect to an addressed image part (e.g. an addressed block).

In WO 2005/104027 pixel values are stored in the working memory wrapped around in line-segment based fashion, pixel values for successive pixel locations along a horizontal line-segment in an image being stored in successive banks, wrapping around from the last memory bank in the succession to the first memory bank in the succession. Pixel values for pixel locations in a segment of the next horizontal line are stored similarly following the pixel values for the previous line segment (optionally aligned to the same memory bank). Typically, the region of pixel locations for which pixel values are stored slides along the image. In this case the memory locations for pixel locations that have slid out of the region can be reused for pixel locations that have slid into the region. Thus, there will be no predetermined memory bank that stores the pixel value for the upper left location in the region.

WO 2005/104027 allows parallel output of pixel values for a block of pixel locations within the stored region. The parallel output is controlled by providing an address of the block in the region (e.g. in terms of the x-y coordinates of the upper left corner of the block). The working memory responds by outputting pixel values from the block at outputs defined by the pixel locations relative to the address of the block. Thus, for example, the pixel value for the location in the upper left corner of the block is output at a first predetermined output and so on.

It is important to note that this type of operation requires a number of parameters to control memory access. For example, there is no predetermined relation between memory banks and locations in addressed blocks. Therefore the coupling of memory banks to outputs has to be controlled dependent on the memory bank wherein the pixel value for a predetermined pixel location in the stored region is stored and the coordinates of the addressed block. Other examples where parameters are needed include the case where the amount of data per pixel location can be varied. For example, in some image processing applications reduced resolution is used for stored color related values in comparison to stored luminance related values. Hence the coupling between banks and output may be different for color and luminance. The same may hold if different quantization accuracy is used for color and luminance. Furthermore, it may be desirable to wrap around storage of pixel values of some images before reaching the full number of memory banks, in order to use the remaining banks to provide for output of another image (or another color component of the same image etc.). This may also complicate the relation between outputs and memory banks.

In the data processing circuit of WO 2005/104027 the necessary parameters are maintained in the memory access circuit. When a block of the memory is accessed the memory access circuit receives the address of the block (e.g. its coordinates) and combines this address with the parameters to select the necessary coupling between memory banks and outputs. Only one set of parameters can be used at a time.

SUMMARY OF THE INVENTION

Among others, it is an object to enable parallel processing of a plurality of data values that depend on location in a signal, wherein different forms of mapping of locations in the signal to memory locations can be used concurrently.

Among others, it is an object to provide a further embodiment that enables parallel processing concurrently using data values that depend on location in the signal in different ways.

The invention is defined by the independent claims. The dependent claims define advantageous embodiments.

A programmable data processing circuit according to claim 1 is provided. This processing circuit stores a plurality of parameter value sets. Certain instructions of the processing circuit contain references to these sets. In response to such instructions the processing circuit retrieving the selected parameter value set and controls assigned of data value positions on a memory port to data value positions on a data port for parallel output of data values such as pixel values. This makes it possible to execute instructions for performing parallel processing of data values on different sets of data values that are stored in mutually different ways in a memory circuit and may involve mutually different types of data intermixed with one another. As used herein a plurality of instructions with different mutually indications of parameter value sets are said to be executed intermixed when they are executed during a time interval during all of which a plurality of data sets is kept stored concurrently in memory according to each of the parameter value sets.

In an embodiment the parameter set storage is a dedicated memory, e.g. a register file, with memory locations (e.g. registers) of sufficient size to store a set of parameter values. In an alternative embodiment a register file may be used that also stores other types of information, if the registers in that register file are of sufficient size.

In an embodiment the instructions have location operands for indicating a signal location of a data values in a signal such as pixel locations in an image signal. In this embodiment the instruction-based assignment of data value locations on the data port is computed from the signal location and the selected parameter value set. Also addresses supplied to the memory may be computed in this way. Thus, instructions are able to use similar location operands for signal location dependent data values that are stored in different ways, or have different types.

In an embodiment the memory circuit comprises a plurality of at least partly independently addressable memory banks. In this embodiment the memory banks supply data values for different data value locations, enabling the use of different addresses for different data value locations. The addresses for the memory banks are from the signal location and the selected parameter value set. Thus, instructions are able to use similar location operands for signal location dependent data values that are distributed in different ways across the memory banks.

In various embodiments the parameter values may represent for example an offset value of a start of storage of a data set in the memory banks, a sub-sampling factor and/or an effective number of used memory banks.

A parallel computation circuit is preferably provides having an input and/or output coupled to the data port. A register file coupled functionally between the data port and the parallel computation circuit may be used to store multi-data value operands and/or result for or from the data port.

A program for such a data processing circuit can use instructions that refer to different data sets that are stored in different ways intermixed with one another. The data sets may have different storage offsets in a plurality of memory banks for example, and/or use different sub-sample factors, and/or use different numbers of the memory banks. In an embodiment instructions in the program that use such different data sets use the same type of location operand, combined with references to different parameter sets, to address each of these different sets. This simplifies the program and speeds up its execution.

These and other objects and advantageous aspects will become apparent from a description of exemplary embodiments, using the following figures.

DESCRIPTION OF EMBODIMENTS

Figure 1:
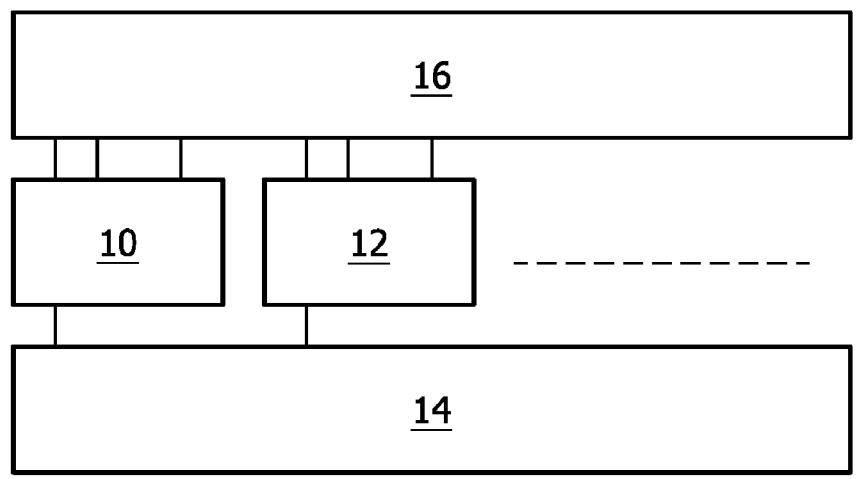
FIG. 1 shows a processing circuit.

FIG. 1 shows a processing circuit comprising a plurality of functional units 10, 12, including an arithmetic unit 10 and a memory access unit 12, an instruction issue circuit 14, and a register file 16. Instruction issue circuit 14 has outputs coupled to inputs of the functional units 10, 12 for issuing instructions. Functional units 10, 12 are coupled to read and write ports of register file 16. By way of example only two functional units are shown, but it should be understood that more functional units might be used, including functional units other than arithmetic units or memory access units.

Figure 2:
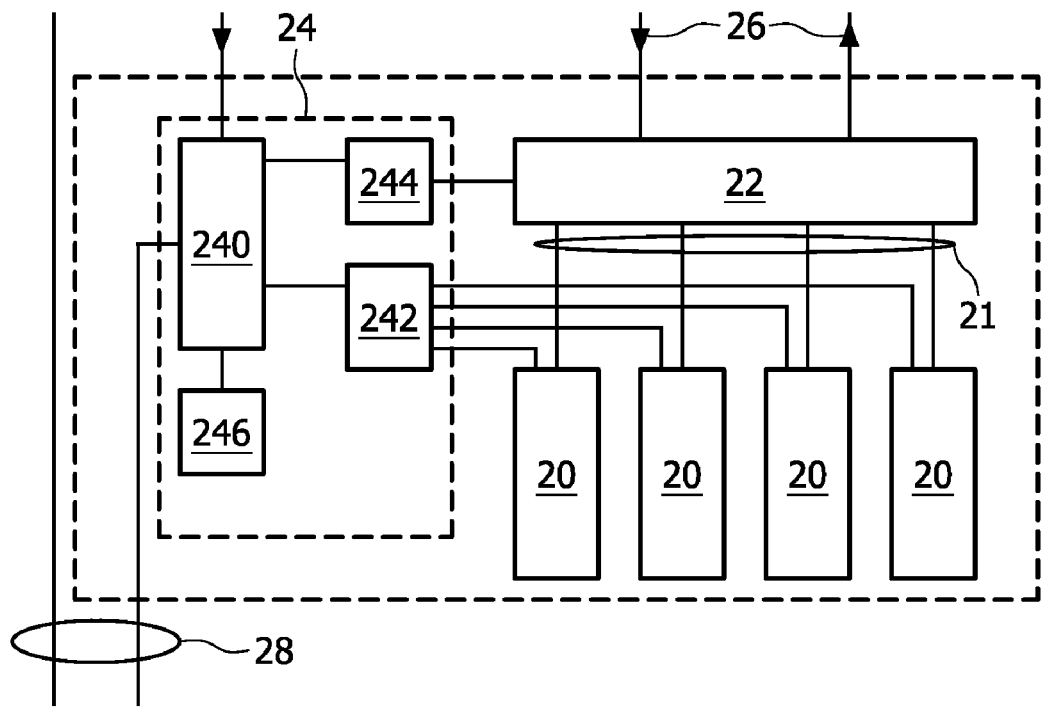
FIG. 2 shows a memory access unit.

FIG. 2 shows a memory access unit, comprising a plurality of memory banks 20, a switching circuit 22, and a control circuit 24. Switching circuit 22 is coupled between inputs and outputs 26 to the register file (not shown) and a memory port 21 from memory banks 20. Control circuit 24 has an instruction input coupled to an instruction input 28 that is coupled output instruction issue circuit (not shown) and control outputs. Part of the instruction input 28 is coupled to port control inputs of the register file (not shown), Control circuit 24 has control outputs coupled to switching circuit 22 and to memory banks 20.

Control circuit 24 comprises a parameter set controlled circuit 240, an address generation circuit 242, a switch control generation circuit 244, and parameter set memory 246. Parameter set controlled circuit 240 has inputs coupled to the instruction input 28 and a read port of the register file (not shown), and outputs coupled to address generation circuit 242 and switch control generation circuit 244. Parameter set selection controlled circuit 240 is coupled to parameter set memory 246, which functions as storage for parameter sets. Address generation circuit 242, a switch control generation circuit 244 have outputs coupled to switching circuit 22 and memory banks 20.

In operation, instruction issue unit 14 supplies successive instructions to the functional units 10, 12. At least part of the instructions each contains a respective command for at least one functional unit 10, 12. At least some of the commands specify an operation, operand registers and a result register in register file 16. During execution of the command operand data is supplied from the specified operand registers, the functional unit 10, 12 executes the specified operation using the operand data and supplies result data to the result register.

In an embodiment each instruction contains commands for different functional units 10, 12 in parallel, but alternatively instructions may be used with one command per instruction. Also the commands may be issued in pipelined fashion, e.g. by supplying operand register addresses, an opcode and a result register address of a command successively.

Figure 3:
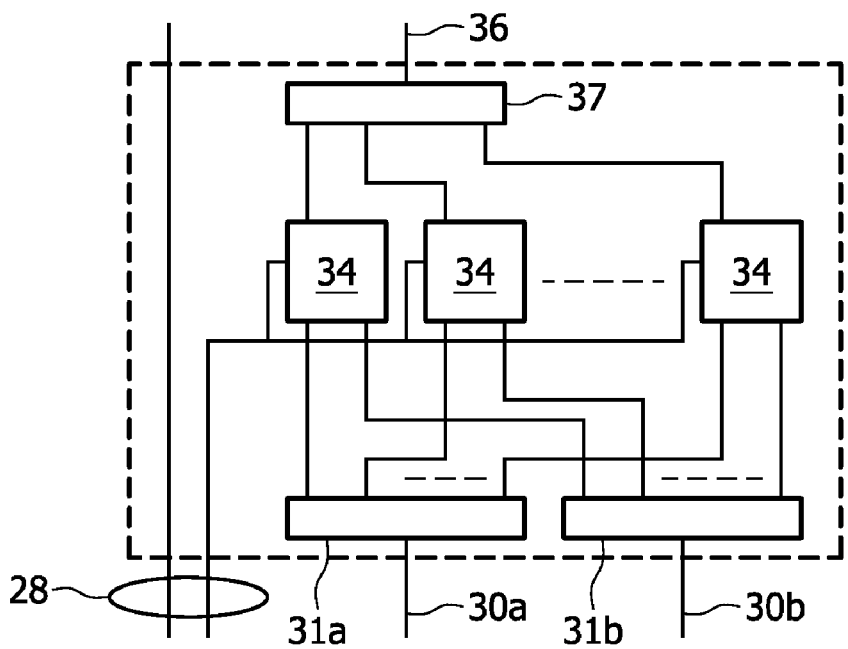
FIG. 3 shows an arithmetic functional element.

FIG. 3 shows an example of an arithmetic functional unit. The arithmetic functional unit comprises a pair of operand inputs 30*a*, 30*b*, a command input 32, a plurality of arithmetic circuits 34, and a result output 36. Operand inputs 30*a*, 30*b* are coupled to respective read ports of the register file (not shown). Typically, each operand input comprises a plurality of conductors for providing respective bits of the operands. Internally, the arithmetic functional unit divides each operand input into a plurality of sections (division indicated symbolically by boxes 31*a*, 31*b*). Each arithmetic circuit 34 receives parts of the operands from a respective section of both operand inputs 30*a*, 30*b*. Similarly, the arithmetic practical unit internally forms the result output from a combination of a plurality of sections (combination indicated symbolically by box 37), each arithmetic circuit 34 supplying part of the result in a respective section. Command input 32 is coupled to the arithmetic circuits 34 to control selection of the operation performed by arithmetic circuits 34.

In an example operation each operand contains a plurality of pixel values, which are processed by respective ones of the arithmetic circuits 34 and the result contains a plurality of pixel values, which are produced by respective ones of the arithmetic circuits 34.

It should be appreciated that this arithmetic functional unit is only one example of usable functional unit. In other examples arithmetic circuits may process pixel values from combinations of the sections from a same operand and/or produce results for combinations of sections. Instead of arithmetic circuits, or in combination therewith, logic circuits may be used, but for convenience all types of circuit will be subsumed under the term arithmetic circuit.

Returning to FIGS. 1, 2, memory access unit 12 executes commands that provide for transfer of data between registers in register file 16 and memory banks 20. In a further embodiment memory banks 20 act as a cache for a background memory (not shown). In this further embodiment the memory access unit also performs cache management including fetching of data from background memory when it is not in memory banks 20 and/or writing data from memory banks 20 to background memory.

Commands for memory access unit 12 include commands to output result data in parallel from a plurality of memory banks 20, for use in parallel processing by arithmetic unit 10. The operands of the commands for memory access unit 12 typically serve to indicate addresses of data values. In the case of read commands the results contain data values read from memory banks 20. In an embodiment the operands are indicated by addresses of registers in register file 16 that contain the operand values, but in an alternative embodiment one or more operand values may be contained literally in the operand.

Commands for memory access unit 12 comprise a type of command that has an operand indicating a parameter set. For the sake of simplicity an embodiment will be described wherein the parameter set is indicated literally via the instruction input 28, but alternatively the indication of the parameter set may come from a register via a read port of register file 16.

The parameter set operand is used to control how data will be read from memory banks 20. The parameter set indicates how data values are stored in memory banks 20, and how switching circuit 22 must couple the memory banks to outputs 26. By way of example, a number of ways of storing pixel values in memory banks 20 will be described.

In a first example, pixel values as a function of position in a rectangular region of pixel locations are stored. For each y-coordinate in the region the region contains a line segment of pixel locations with respective x-coordinates. Pixel values for pixel locations along a line segment are stored consecutively in respective banks, going back to the first bank when all banks have been visited and starting the line segment for the next y-coordinate after the end of the preceding line segment. Thus, for example, a first and second memory location of a first bank contain pixel values for the first and fifth pixel location along the first line segment, a first and second memory location of a second bank contains pixel values for the second and sixth pixel location along the first line segment, and so on up to the fourth bank. In the third and fourth memory location of the first bank pixel values for the first and fifth pixel location along the second line segment are stored and so on.

More generally if there are N banks then the ith bank may contain pixel values with x-coordinate $i=x \bmod N$ for all values of y. If the region is M pixels wide and M is not a multiple of N the pixel values of different line segments may be stored starting from the first memory bank or head to tail. In the latter case, if the x and y coordinates of a pixel location are x and y the ith bank stores pixel values for pixel locations with $i=x+M*y \bmod N$.

In another example pixel values may be stored with an offset, which affects the memory bank where an initial pixel value of a region is stored. In this case, if the x and y coordinates of a pixel location are x and y, the ith bank stores pixel values for pixel locations with $i=x0+x+M*(y+y0) \bmod N$, wherein x0 and y0 are the x and y offset values. In the embodiment wherein pixels with the same x coordinate are stored in the same bank $i=x0+x \bmod N$.

In a further example each memory location contains a plurality of pixel values. In an example the first memory location of the first bank contains pixel values for the first to fourth pixel locations along the first line segment; the first memory location of the second bank contains pixel values for the fifth to eight pixel location along the first line segment and so on. In the second memory location of the first bank pixel values for the seventeenth to twentieth pixel location along first line segment are stored and so on. Assuming the first line segment to contain thirty-two pixel locations, the third memory location of the first bank contains pixel values for the first to fourth pixel location along the second line segment and so on.

More generally in this further example if there are N banks then the ith bank may contain pixel values with x-coordinate $i=j+P*x \bmod N$, where $j=0 \ldots P-1$ (P being the number of pixel values in a memory location) for all values of y. If the region is M pixels wide and M is not a multiple of N the pixel values of different line segments may be stored starting from the first memory bank or head to tail. In the latter case, if the x and y coordinates of a pixel location are x and y the ith bank stores pixel values for pixel locations with $i=j+P*x+P*M*y \bmod N$. In another example the number of bits per pixel value may be different for different data. For example 8 bit pixel values may be used for luminance data and 4 bits per pixel for color values and a larger number of bits for motion vectors. This has the effect that more pixel values can be stored in the same location, or in other words that P is different for different types of data. In this case too, one or more offsets x0, y0 may be used.

In another example sub-sampled pixel values may be used, which means that data values are stored only for selected pixel locations. These pixels locations can be described by coordinates (x,y)=(x0+ix*Sx, y0+iy*Sy). Herein Sx, Sy are horizontal and vertical subsample factors (e.g. Sx, Sy=½), and ix and iy are integers. When subsampling is used preferably no memory locations are reserved for unused locations. In this case ix and iy take over the role of the x and y coordinates in determining the memory locations.

In the examples up to this point it has been assumed that the same initial memory bank always stores the pixel value for the initial pixel location in the stored region. More generally, any bank may store this pixel value. In this case the memory bank with number (j+j1) mod N bank (where j and j1 integers) may take over the role described in the preceding for the jth bank. In this case there is a bank offset of j1.

In the examples up to this point it has been assumed that pixel values for successive pixel locations are stored in the successive memory banks using all memory banks for a first part of the succession of pixel locations, the pixel value for a next part of the succession of pixel locations being all memory banks and so on. In another embodiment only part of the memory banks may be used for selected sets of pixel values. Thus for example first color values (e.g. U values) for a set of pixel locations may be stored in a first and second memory bank, and second color values (e.g. V values) may be stored in a third and fourth memory bank. More generally this means that an effective number of banks N' which is less than the total number of banks N may be used instead of N for selected sets of pixel values. In addition an initial bank number B may be used to indicate from which bank on banks are used.

Although examples have been given wherein pixel values are stored first according to increasing x coordinate and then according to increasing y-coordinate, it will be understood that alternatively pixel values can be stored first according to y coordinate or according to increasing or decreasing coordinate value. A parameter may be used to indicate which form of storage is used for a set of pixel values.

Although the examples have been given in terms of pixel values, for which, due to the complexity of known image processing algorithms, use of different forms of storage is especially advantageous. However, it should be noted that this form of storage could also be applied to at least two-dimensional signals in general (not just image signals) or even to one-dimensional signals (e.g. time dependent signals such as audio signals). When higher dimensional signals are used (e.g. images as a function of pixel coordinates and time, or as a function of pixel coordinates and scale) more parameters will typically be used to control storage.

As will be realized from the examples, various parameters affect storage locations. The parameters may include any one or a combination of the number of pixel locations M in a line segment of a stored region, the offset x0, y0, the subsample factors Sx, Sy, the number of pixel values per memory location P, the bank offset j1, the effective number of banks N', the initial bank B, an indication of the primary storage coordinate (e.g. a boolean value that is true if x is the primary coordinate, and false if y is the primary coordinate). Instead, or in addition other parameters may be used.

Memory access unit 12 supports concurrent use of a plurality of sets of values for such parameters, to describe storage of different sets of data values (e.g. pixel values). A plurality of these sets of values is stored in parameter set memory 246. Memory access circuit 12 supports a type of instructions that includes an indication to select one of the stored sets. In one embodiment the indication is included as literal data in the instruction in another embodiment the indication is provided in an operand from register file 16. Furthermore instructions of this type have a location operand that comprises an indication of a pixel location (or more generally a location in a signal), for example in terms of coordinates relative to a current region.

Upon reception of an instruction of this type parameter set controlled circuit 240 retrieves the selected parameter set (or at least part thereof) from parameter set memory 246 and uses the selected parameter set in combination with the location operand to control address generation circuit 242 and switch control generation circuit 244. Address generation circuit 242 generates addresses for memory banks 20 dependent on the signals from parameter set controlled circuit 240. Switch control generation circuit 244 generates switch control signals for switching circuit 22 dependent on the signals from parameter set controlled circuit 240.

This type of instruction can be a read type instruction or a write type of instruction. Under control of the read type instruction memory banks 20 perform a read operation. In the case of a read type instruction, memory banks 20 output a plurality of data values (e.g. pixel values) in parallel and switching circuit 22 outputs a result that comprises at least a plurality of these data values in parallel to a write port of register file 16. Switching circuit 22, if necessary, rearranges the relation between the memory bank 20 that outputs a data value and a position in the result that is output to the write port of register file 16. In an embodiment it is ensured that the position of a data value in the result depends only on the signal position (e.g. pixel location) relative to the location indicated by the location operand.

In an example wherein the ith memory bank 20 stores pixel values for the pixel location with pixel coordinates x, y if i=(x0+x+M*(y+y0))mod N, switching circuit 22 supplies the pixel value form the jth bank to a position (j−i0) mod R in the result that is supplied to the write port of register file 16 (herein R is the number of positions for pixel values in the result and i0 is the number of the memory bank that stores the pixel value for the location indicated by the location operand of the instruction). In this case parameter set controlled circuit 240 uses the parameter values for x0, y0 and M to control switch control generation circuit 244.

Similarly, parameter set controlled circuit 240 controls the selection of addresses for the different memory banks by address generation circuit 242. Typically, two different adjacent addresses will be used, or the same address will be used for each memory bank 20, dependent on whether the address changes along a series of pixel locations that has to be output in parallel. In the preceding example, the address in the ith memory bank may be (i−i0)/N for example, in which case parameter set controlled circuit 240 and address generation circuit 242 supply corresponding addresses.

It will be appreciated that, dependent on the parameters that are used and the manner of addressing memory banks, more complicated computations may be used to control addressing of memory banks 20 and selection by switching circuit 22. The specific circuits used in parameter set controlled circuit 240, address generation circuit 242 and switch control generation circuit 244 depend on the nature of the parameters that are supported.

Figure 4:
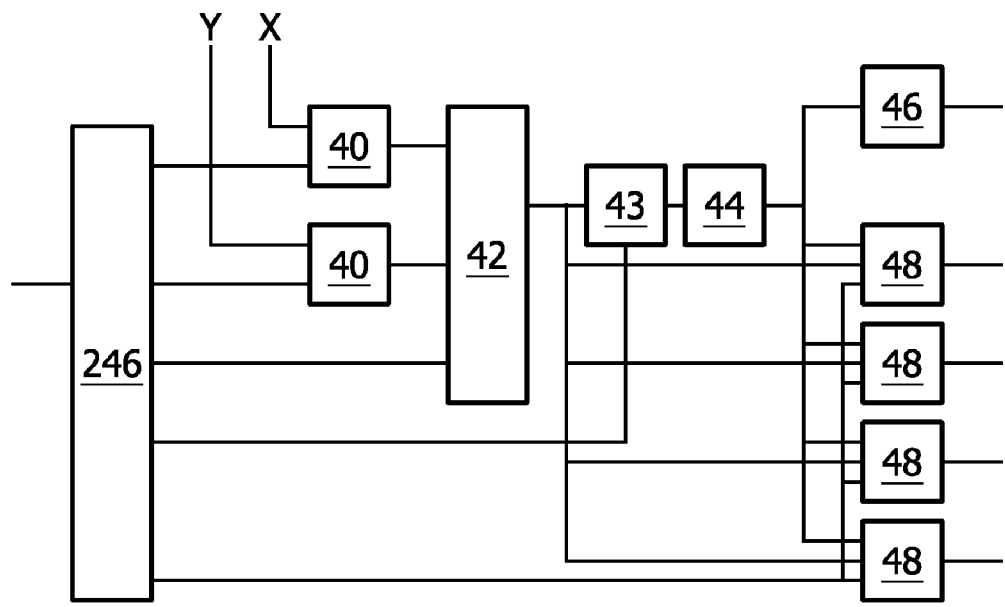
FIG. 4 shows part of a memory access control circuit.

FIG. 4 shows a typical embodiment of the combination of these circuits. Only a computation part is shown: not shown are control connections for selecting between reading and writing etc. In this embodiment the combination comprises multipliers 40 (e.g. in the form of barrel shift circuits when the allowable window sizes, sampling factors etc are a power of two) with outputs coupled to an adder 42, which is coupled in series with a modulo circuit 43 (also typically operating modulo a power of two), a further adder 44. Further adder 44 has an output coupled to conversion circuits 46, 48.

In this typical embodiment multipliers 40 are used for example to account for region width M (multiplication with y-coordinate derived from the location operand) and/or sub-sampling factors. Adder 42 handles addition of the contributions due to the x and y coordinates, the addition of the offset. Modulo circuit 43 accounts for the selected effective number of banks N'. Further adder 44 adds a bank offset. In this embodiment further adder 44 outputs a bank number of a bank that contains a first pixel value that is to be output to a first position in the result. A first conversion circuit 46 converts this into a control signal for the switching circuit (not shown). Second conversion circuits 48 use the initial bank number, an address offset of the relevant set of pixel values and the computed addresses to determine the addresses for different memory banks. The various elements receive parameter values obtained from parameter value memory 246 in response to the indication of the selected set of parameter values in the command for the memory access unit.

It should be emphasized that the circuit of FIG. 4 is merely one simple example of a circuit to generate switch control signals for switching circuit 22 and addresses for memory banks 20. Many alternatives exist both for performing similar operations or simplified or more complicated operations, as needed for the particular combination of parameters that is supported by the memory access unit.

In the case of a write type instruction data is written from a read port of register file 16 to memory locations in memory banks. In this case switching circuit 22 coupled respective parts of read ports to respective controllable ones of the memory banks 20. Under control of the write type command memory banks 20 perform a write operation. The operation of control circuit 24, to generate switching control signals and addresses is similar to the case of read type instructions.

As will be appreciated the described circuit performs the function of converting outputs from memory banks 20 into a result with a plurality of data values in response to a read type instruction, and/or the function of storing respective parts of an operand of a write type instruction into memory banks 20 in response to the read type instruction. In each case the circuit uses an adjustably controlled relation between the memory banks and positions in the result. The relation is controlled by means of information in the read or write type instruction that indicates a selection of a set of parameter values among a plurality of such sets in control circuit 24.

In operation the circuit executes a program of instructions, which may contain a mix of read and/or write type instructions, which indicate mutually different sets of parameter values. In an embodiment different sets of parameter values may be stored provide for pixel values of a first region of pixel locations stored starting from one offset in the series of memory banks and pixel values of a second region of pixel locations stored starting from another offset in the series of memory banks. Thus access to these different regions can be performed concurrently (i.e. in respective instructions that are intermixed with one another) without loading and reloading the different regions.

In another embodiment different sets of parameter values may be stored provide for first pixel values (e.g. luminance values Y) stored with one spatial resolution together with second pixel values (U and/or V) at a sub-sampled resolution in different parts of the memory banks. Similarly this type of data may be mixed with motion vector data for pixel locations at an even lower resolution. Thus access to data of these different types can be performed concurrently without loading and reloading the different data.

In a further embodiment different sets of such data may be stored in mutually exclusive subsets of the memory banks 20. In this embodiment the memory access unit is arranged to receive a plurality of indications of parameter sets in a same instruction and to input and/or output data values arranged according to the plurality of indicated sets together to a write port or from a read port of register file 16. This can be realized for example by duplicating the circuitry for processing a single indication and selecting respective parts of switching control signals and memory addresses from the output of the duplicated circuitry. Thus access to combinations of sets of data can be performed in the same instruction.

In an embodiment memory access unit is arranged to support a further instruction type for writing parameter values to selected locations in the parameter value memory. In operation a program is executed containing instructions to set the values of the parameter values before reading or writing data values in memory banks 20.

Figure 5:
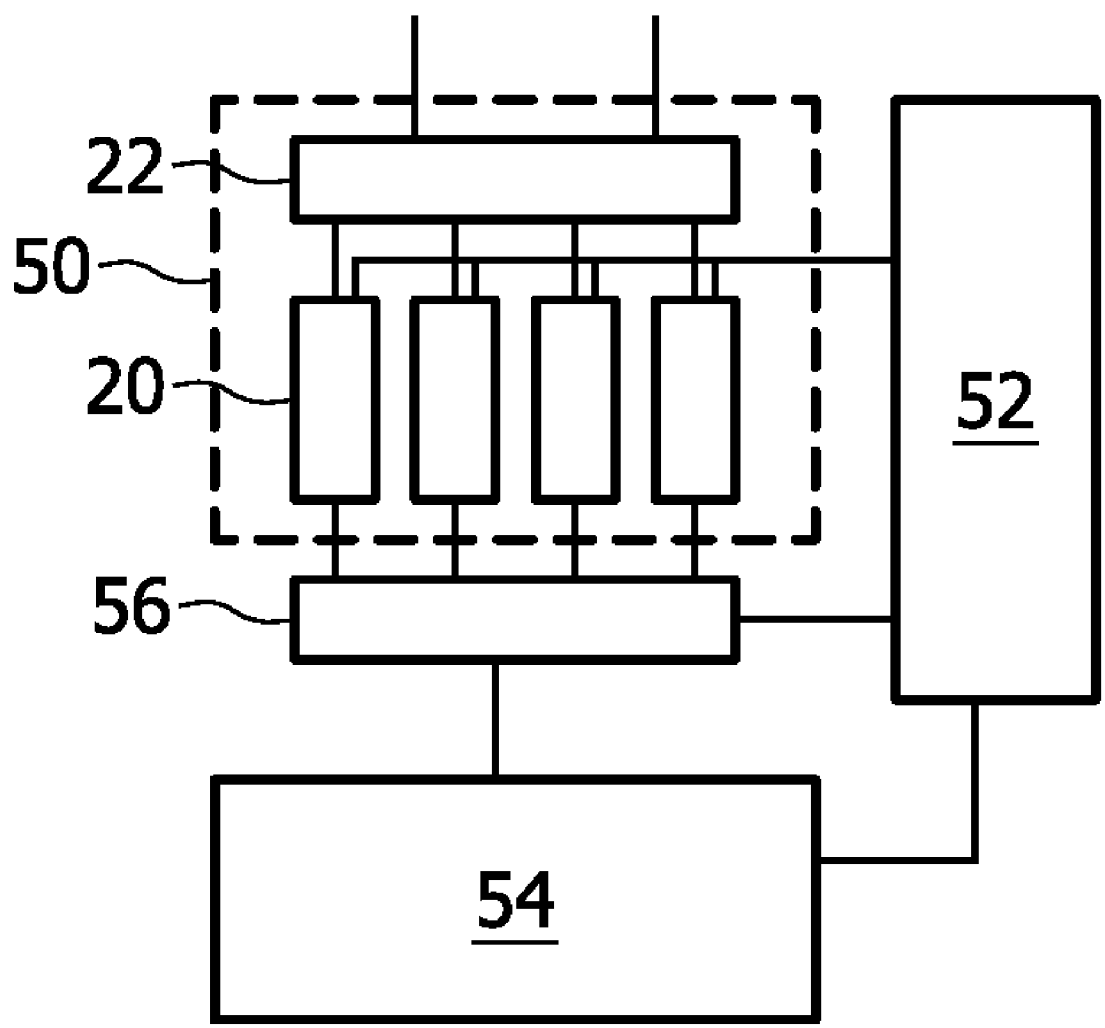
FIG. 5 shows a cache configuration.

Although only memory banks 20 have been shown, it should be understood that these banks might be used to act as a cache for a background memory. FIG. 5 shows a cache configuration in which a cache memory 50 contains memory banks 20. The memory access unit also contains a cache control circuit 52 and an interface circuit 56 to background memory 54. Cache control is known per se. In an embodiment the cache control circuit 52 also has access to the stored parameter values for use to determine background memory addresses for fetching or storing data in background memory 54, by computing addresses in the cache memory 50 according to the parameter set corresponding to a part of the data in cache memory and corresponding addresses in main memory 54 as appropriate for the way in which the data values for different pixel locations are stored in background memory 54.

An embodiment of the invention can be summarized as follows. A programmable data processing circuit has a memory for storing pixel values, or more generally data values as a function of position in a signal. The programmable data processing circuit supports instructions that include an indication of a selected parameter value set that indicates how a plurality of data values must be arranged for parallel output from a memory. Instructions that indicate different parameter value sets can be executed intermixed with one another. The programmable data processing circuit responds to instructions of this type by retrieving the selected parameter value sets from a parameter storage circuit 246, and controlling a switching circuit 22 between a memory port 21 of a memory circuit 20 and a data port 26 at least partly dependent on the selected parameter value set.

Although a parameter value memory 246 has been shown as an example of a parameter storage circuit, it should be appreciated that any form of storage may be used. In the illustrated example all parameter values are provided from the parameter value memory in response to an indication of a set of parameter values. Thus, the parameter value memory acts as a dedicated register file with registers for parameter sets. In this way special registers for large parameter sets can be provided. However, it should be appreciated that in an alternative embodiment part of the parameter values may be supplied partly or wholly as operand data of an instruction, for example from registers in register file 16, if these are large enough to hold a parameter set. In this case parameter value memory 246 is part of register file. Any kind of parameter storage circuit may be used.

Although an embodiment has been described wherein operands and results (other than the parameter value sets) are read and written to a single register file, it should be appreciated that in practice such a single register file may comprise a plurality of register files with registers of different size. Thus for example registers with location operands or indications of selection of parameter sets may be smaller than registers that contain a plurality of data values.

Furthermore, in another embodiment operands and results may be provided directly to and/or from a memory access unit to an arithmetic circuit, without using intervening storage in a register file.

Also, although specific examples have been given of parameters that control how data is rearranged between operands/results and memory banks 20, it should be appreciated that other parameters and other ways of controlling rearrangement can be used.

Although various operations for an instruction, such as instruction issue, register read and write, instruction execution, address selection, switching selection have been described together, it should be appreciated that different operations may be performed in pipelined fashion.

Furthermore, although an example of an arithmetic circuit has been shown, it should be appreciated that the described form of memory access can be performed in combination with other type of functional element that process operands and/or produce results that contain a plurality of data values.

It should thus be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A programmable data processing circuit comprising:
a memory circuit having a plurality of memory banks and a memory port;
a data port;
a controllable switching circuit, coupled between the memory port and the data port, for providing a controllable coupling between respective data value positions of the data port and data value positions of the memory port dependent on a control signal;
a parameter storage circuit for storing a plurality of parameter value sets, each comprising at least one parameter value, each parameter value set at least partly determining an assignment of data value positions of the data port to data value positions of the memory port;
an instruction execution control circuit coupled to the switching circuit and the parameter storage circuit, the instruction execution control circuit comprising a parameter set controlled circuit, a single switch control generation circuit, and an address generation circuit having, for each of the memory banks, a dedicated output; and
an instruction set of the instruction execution control circuit including an instruction that comprises an indication of a selected parameter value set, the instruction execution control circuit being configured to respond to the instruction by retrieving the selected parameter value set from the parameter storage circuit, to have the single switch control generation circuit control the switching circuit according to the assignment determined using the selected parameter value set, and to have the address generation circuit generate addresses for each of the memory banks dependent on the signals from parameter set controlled circuit.

2. The programmable data processing circuit according to claim 1, wherein the instruction furthermore has a location operand for indicating a signal location of a data values in a signal, the instruction execution control circuit being configured to compute the assignment from the signal location and the selected parameter value set.

3. The programmable data processing circuit according to claim 2, wherein the instruction execution control circuit is configured to supply an address to the memory circuit, and to compute the address from the signal location and the selected parameter value set.

4. The programmable data processing circuit according to claim 2, wherein the memory circuit comprises a plurality of at least partly independently addressable memory banks, each configured to read or write at least one data value for a respective one of the data value positions on the memory port, the instruction execution control circuit being configured to supply addresses to the memory banks, and to compute the addresses from the signal location and the selected parameter value set.

5. The programmable data processing circuit according to claim 4, wherein the parameter value sets each define at least an offset value, the instruction execution control circuit being configured to compute the assignment by adding the offset value to a value derived from the location operand, modulo an effective number of banks.

6. The programmable data processing circuit according to claim 4, wherein the parameter value sets each define at least an offset value, the instruction execution control circuit being configured to compute the addresses for the memory banks dependent on a sum of the offset value and a value derived from the location operand.

7. The programmable data processing circuit according to claim 4, wherein the parameter value sets each define at least a sub-sampling factor, the instruction execution control circuit being configured to compute the assignment and/or the addresses for the memory bank from a product of the sub-sample factor and a value derived from the location operand.

8. The programmable data processing circuit according to claim 4, wherein the parameter value sets each define at least an effective number of used memory banks for the instruction, the instruction execution control circuit being configured to compute the assignment and/or the addresses for the memory bank from a value derived using the location operand modulo the effective number of used memory banks.

9. The programmable data processing circuit according to claim 1, further comprising a parallel computation circuit, having an input and/or output coupled to the data port.

10. The programmable data processing circuit according to claim 9, further comprising a register file16) coupled functionally between the data port and the parallel computation circuit.

11. The programmable data processing circuit according to claim 1, wherein the instruction execution control circuit is configured to receive the indication of the selection of the parameter value set from a register addressed by an operand of the instruction.

12. The programmable data processing circuit according to claim 1, wherein the instruction execution control circuit is configured to receive the indication of the selection of the parameter value set from literal data in the instruction.

13. The programmable data processing circuit according to claim 1, programmed with a program for concurrently addressing data values in the memory circuit with said instruction, using instructions with indications that indicate selections of mutually different sets of parameter values.

14. The programmable data processing circuit according to claim 1, wherein the memory circuit comprises a cache memory, a background memory and a cache control circuit, the cache memory being coupled to the memory port, the cache control circuit being configured to use the sets of parameter values to select locations in the cache memory for locations in the background memory.

15. A computer program product comprising a program for a programmable data processing circuit according to claim 1, the program comprising instructions that each include a respective indication of a selected parameter value set, at least part of the instructions selecting mutually different parameter value sets intermixed with one another, in a part of the program during whose execution data values addressed by each of said part of the instructions are stored simultaneously in a memory circuit, to control mapping of data values to parallel parts of a data port during parallel output, dependent at least partly on the selected parameter value sets.

16. A method of processing data values, the method comprising:
executing instructions that each include a respective indication of a selected parameter value set, at least part of the instructions selecting mutually different parameter value sets intermixed with one another,
responding to said instructions by retrieving the selected parameter value set from a parameter storage circuit,
controlling, by a single switch control generation circuit, a switching circuit between a memory port of a memory circuit and a data port, at least partly dependent on the selected parameter value set to provide a controllable coupling between respective data value positions of the data port and data value positions of the memory port, and
generating, by an address generation circuit, addresses for each of the memory banks and providing said addresses by respective outputs of the address generation circuit dedicated to each memory bank.

17. The method according to claim 16, comprising computing an assignment of data value positions of the data port to data value positions of the memory port from a combination of a signal location operand of the instruction and the selected parameter value set.

18. The method according to claim 17, applying at least one address to the memory circuit and computing the at least one address for the memory circuit from the signal location and the selected parameter value set.

19. The method according to claim 17, wherein the memory circuit comprises a plurality of at least partly independently addressable memory banks, each configured to read or write at least one data value for a respective one of the data value positions on the memory port, the method comprising supplying addresses to the memory banks, and computing the addresses from the signal location and the selected parameter value set.

20. The method according to claim 19, wherein the parameter value sets each define at least an offset value, the assignment being computed by adding the offset value to a value derived from the location operand, modulo an effective number of banks.

21. The method according to claim 19, wherein the parameter value sets each define at least an offset value, the method comprising compute the addresses for the memory banks dependent on a sum of the offset value and a value derived from the location operand.

22. The method according to claim 19, wherein the parameter value sets each define at least a sub-sampling factor, the method comprising computing the assignment and/or the addresses for the memory bank from a product of the sub-sample factor and a value derived from the location operand.

23. The method according to claim 19, wherein the parameter value sets each define at least an effective number of used memory banks for the instruction, the method comprising computing the assignment and/or the addresses for the memory bank from a value derived using the location operand modulo the effective number of used memory banks.

24. A processor for processing data values, the processor comprising:
means for executing instructions that each include a respective indication of a selected parameter value set, at least part of the instructions selecting mutually different parameter value sets intermixed with one another,
a single means for responding to said instructions by retrieving the selected parameter value set from a parameter storage circuit,
means for controlling a switching circuit between a memory port of a memory circuit and a data port, at least partly dependent on the selected parameter value set to provide a controllable coupling between respective data value positions of the data port and data value positions of the memory port, and
address generation means having, for each of respective memory banks of the memory circuit, a dedicated output, and being configured for generating addresses for each of the memory banks at least partly dependent on the selected parameter value set.

25. A programmable data processing circuit comprising:
a memory for storing data values as a function of position in a signal, the memory having a plurality of memory banks,
means for supporting instructions that include an indication of a selected parameter value set that indicates how a plurality of data values must be arranged for parallel output from a memory, wherein instructions that indicate different parameter value sets can be executed intermixed with one another,
a single means for responding to said instructions that indicate different parameter value sets by retrieving the selected parameter value set from a parameter storage circuit, and controlling a switching circuit between a memory port of a memory circuit and a data port at least partly dependent on the selected parameter value set, and
an address generation means having for each of respective memory banks of the memory circuit a dedicated output, and being configured for generating addresses for each of the memory banks at least partly dependent on the selected parameter value set.

* * * * *